United States Patent [19]
Beah et al.

[11] Patent Number: 5,951,647
[45] Date of Patent: Sep. 14, 1999

[54] METHOD AND SYSTEM FOR RECONFIGURING A COMMUNICATIONS STACK

[75] Inventors: Delan Beah, Issaquah; Stephen D. Gunn; Donald L. Baldwin, both of Kirkland, all of Wash.

[73] Assignee: Attachmate Corporation, Bellevue, Wash.

[21] Appl. No.: 09/034,600

[22] Filed: Mar. 3, 1998

Related U.S. Application Data

[63] Continuation of application No. 08/579,925, Dec. 28, 1995, Pat. No. 5,754,788.

[51] Int. Cl.$^6$ .............. G06F 15/16; G06F 13/38
[52] U.S. Cl. ............ 709/232; 709/231; 707/10; 707/104
[58] Field of Search .............. 395/337, 182.09, 395/500, 200.31, 200.57, 200.61, 874, 200.51; 711/153; 709/232, 231, 237, 221, 236; 707/10, 104

[56] References Cited

U.S. PATENT DOCUMENTS

| | | | |
|---|---|---|---|
| 4,771,375 | 9/1988 | Beglin et al. | 364/200 |
| 4,876,662 | 10/1989 | Pence | 364/900 |
| 4,914,570 | 4/1990 | Peacock | 364/200 |
| 4,949,254 | 8/1990 | Shorter | 364/200 |
| 4,982,324 | 1/1991 | McConaughy et al. | 364/200 |
| 4,991,133 | 2/1991 | Davis et al. | 364/900 |
| 5,001,628 | 3/1991 | Johnson et al. | 364/200 |
| 5,027,271 | 6/1991 | Curley et al. | 364/200 |
| 5,123,094 | 6/1992 | McDougall | 395/375 |
| 5,144,692 | 9/1992 | Baker et al. | 395/425 |
| 5,165,031 | 11/1992 | Pruul et al. | 395/575 |
| 5,175,852 | 12/1992 | Johnson et al. | 395/600 |
| 5,210,859 | 5/1993 | Aoshima et al. | 395/575 |
| 5,228,137 | 7/1993 | Kleinerman et al. | 395/500 |
| 5,230,065 | 7/1993 | Curley et al. | 395/200 |
| 5,239,647 | 8/1993 | Anglin et al. | 395/600 |
| 5,278,834 | 1/1994 | Mazzola | 370/94.1 |
| 5,309,564 | 5/1994 | Bradley et al. | 395/200 |
| 5,317,568 | 5/1994 | Bixby et al. | 340/825.14 |

(List continued on next page.)

OTHER PUBLICATIONS

IBM Virtual Machine/Enterprise Systems Architecture, *CMS Application Development Reference*, Doc. No. SC24–5451–04, Release 2.2, Fifth Edition, Jun. 1994, pp. 20–25, 27–30, 33, 41, 43–55, 64–68, 81, 85, 89–92, 96, 119–112.

(List continued on next page.)

*Primary Examiner*—Daniel H. Pan
*Attorney, Agent, or Firm*—Seed and Berry LLP

[57] ABSTRACT

A method and system for reconfiguring a communications stack. The system provides a comstack manager that can be used with a communications stack having any number of layers, which may be located on different computers. In addition, the comstack manager facilitates the reconfiguration of a communications stack without having to modify any communications stack layers. Each layer provides a single entrypoint through which it communicates to its adjacent layers, and the communications stack layers communicate with each other using a message transfer system that has a single entrypoint for transferring messages. The single entrypoint of the layer provides compatibility among the layers and flexibility since each layer is not bound to a specific definition of another layer's functions. That is, each layer only needs to know how to access the single entrypoint which is the same for each layer. The comstack manager receives configuration information at runtime that contains an indication of each communications stack layer, a reference to their location which indicates whether the layer is located on a local or remote computer, and the ordering of the layers. After receiving the configuration information, the system comstack manager starts the communications stack. As such, reconfiguring the communications stack merely requires sending the comstack manager new configuration information indicating either a new communications stack or one or more new layers in the communications stack.

9 Claims, 15 Drawing Sheets

U.S. PATENT DOCUMENTS

| | | | |
|---|---|---|---|
| 5,317,728 | 5/1994 | Tevis et al. | 395/600 |
| 5,329,619 | 7/1994 | Pagé et al. | 395/200 |
| 5,390,351 | 2/1995 | Di Giulio et al. | 304/DIG. 1 |
| 5,442,791 | 8/1995 | Wrabetz et al. | 395/650 |
| 5,471,615 | 11/1995 | Amatsu et al. | 395/200.03 |
| 5,485,579 | 1/1996 | Hitz et al. | 395/200.12 |
| 5,509,123 | 4/1996 | Dobbins et al. | 395/200.15 |
| 5,513,317 | 4/1996 | Borchardt et al. | 395/183.21 |
| 5,517,622 | 5/1996 | Ivanoff et al. | 395/200.13 |
| 5,519,851 | 5/1996 | Bender et al. | 395/500 |
| 5,519,863 | 5/1996 | Allen et al. | 395/650 |
| 5,526,485 | 6/1996 | Brodsky | 395/183.14 |
| 5,566,337 | 10/1996 | Szymanski et al. | 395/733 |
| 5,590,313 | 12/1996 | Reynolds et al. | 395/500 |
| 5,608,908 | 3/1997 | Barghouti et al. | 395/703 |
| 5,619,650 | 4/1997 | Bach et al. | 395/200.1 |
| 5,675,796 | 10/1997 | Hodges et al. | 395/670 |
| 5,682,532 | 10/1997 | Remington et al. | 395/683 |

OTHER PUBLICATIONS

IBM Virtual Machine/Enterprise Systems Architecture, *SFS and CRR Planning, Administration, and Operation*, Doc. No., SC24–5649–02, Release 2.2, Third Edition, Jun. 1994, Chapter 8 and Appendix B.

IBM Virtual Machine/Enterprise Systems Architecture, *CMS Diagnosis Reference*, Doc. No. LY24–5244–04, Release 2.2, Fifth Edition, Jun. 1994, chapters 6 and 7.

IBM Virtual Machine/Enterprise Systems Architecture, *Connectivity Planning, Administration, and Operation*, Doc. No. SC24–5448–03, Release 2.2, Fourth Edition, Jun. 1994, pp. 199–203.

Edmunds, John J., *SAA/LU6.2 Distributed Networks and Applications*, McGraw–Hill, Inc., 1992, Chapters 1–6 and 8.

Marco Libraries Soruce Code released with IBM, VM, SP Release 6, IBM Corp. 1990.

IBM product announcement, MVS/ESA SP Version 5 Release 2 and MVS/ESA SP Version 5 release 2.2, Feb. 28, 1995, 98 pages.

IBM product announcement LAN File Services/ESA Version 1, Release 1.2, No. 294–534, Sep. 13, 1994, 16 pages.

Sun Soft; *Debugging a Program*, Sun Microsystems, Inc., 1994, Table of Contents, Section 5 and 6.

Hagimont, Daniel, P.–Y Chevalie, A. Freyssinet, et al., "Persistent Shared Object Support in the Guide System; Evaluation & Related Work", ACM, pp. 129–144.

Kemper, Alfons and Kossman, Donald, "Adaptable Pointer Swizzling Strategies in Object Bases", IEEE, 1993, pp. 155–162.

Wilson, Paul R. and Kakkad, Sheetal V., "Pointer Swizzling at Page Fault Time: Efficiently and Compatibly Supporting Huge Address Spaces on Standard Hardware," IEEE, 1992, pp. 364–377.

Moss, J. Eliot B., "Working with Persistent Objects: To Swizzle or Not to Swizzle", IEEE, 1992, pp. 657–673.

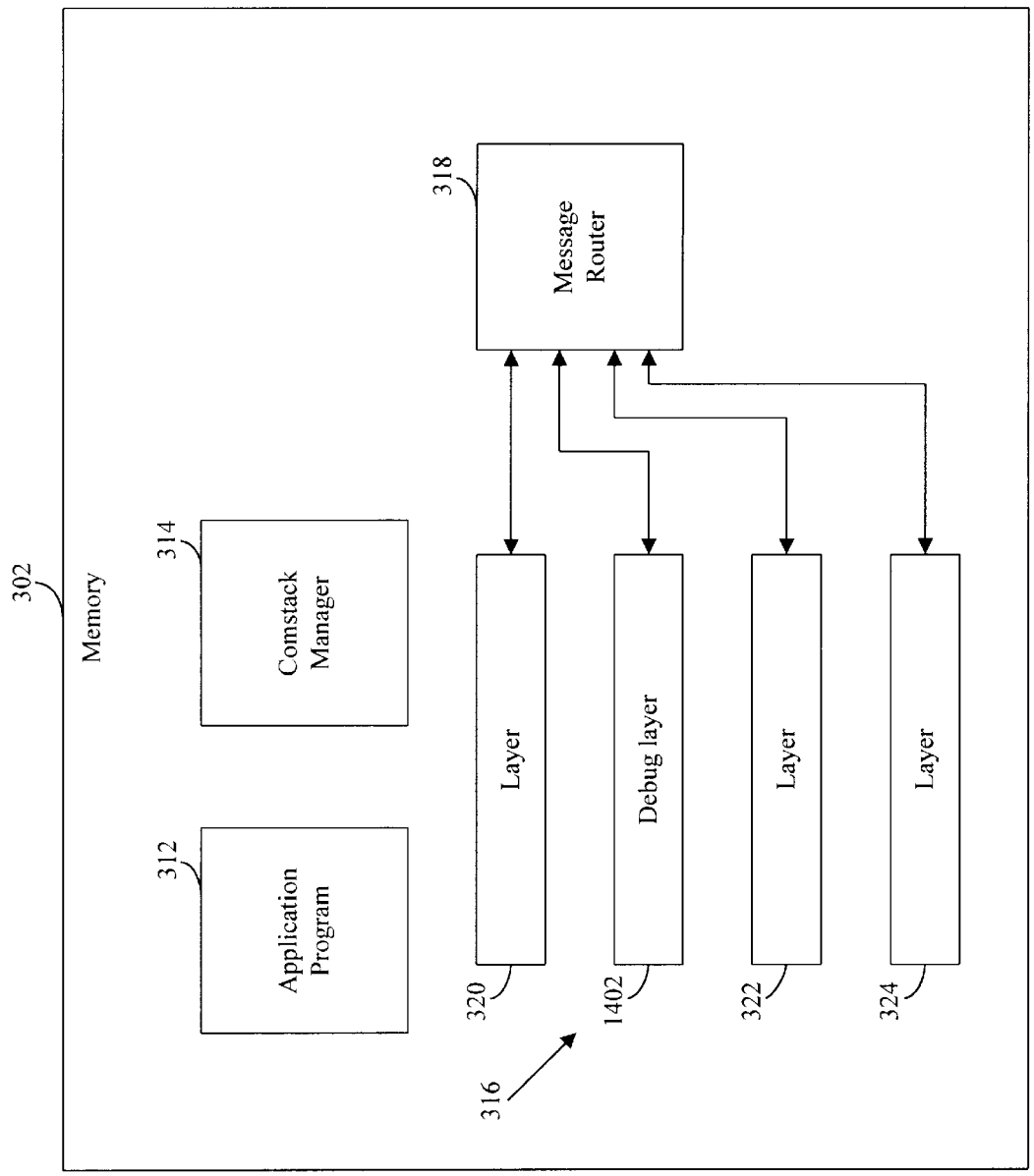

METHOD AND SYSTEM FOR RECONFIGURING A COMMUNICATIONS STACK

CROSS-REFERENCE TO RELATED APPLICATION

This application is a continuation of U.S. patent application Ser. No. 08/579,925, filed on Dec. 28, 1995, now U.S. Pat. No. 5,754,788.

TECHNICAL FIELD

The present invention relates generally to data processing systems and, more particularly, to reconfiguring a communications stack.

BACKGROUND OF THE INVENTION

Conventional data communications systems contain a communications stack for transferring data between computers. Each computer typically has a communications stack which contains a number of layers. For example, the open systems interconnect (OSI) communications stack defined by the International Standards Organization consists of seven layers. The layers form a sequence from a lowest layer (or bottom layer) to the highest layer (or top layer). The layers are used to divide the processing necessary for communicating between computers into discrete units. The bottom layer in the communications stack typically interacts with the physical medium used for transferring the data, such as coax cables. The top layer of the communications stack provides services to application programs and the middle layers of the communications stack typically are responsible for routing and maintaining a connection. Data is transferred between a local computer and a remote computer by an application program first passing the data to the top layer of the communications stack of the local computer. The top layer then processes the data and sends the data to the next lowest layer in the communications stack. Thereafter, each layer in turn processes the data until the data reaches the bottom layer, where the data is sent to the remote computer over the transfer medium. The bottom layer of the communications stack of the remote computer receives the data from the transfer medium and passes the data up the communications stack. Each layer performs its specific processing on the data until the data reaches the top layer. The top layer processes the data and sends the data to an application program.

A comstack manager is typically associated with the communications stack and is responsible for starting the communications stack and for maintaining the communications stack during its lifetime. FIG. 1 depicts a communications stack 100 that is managed by a conventional comstack manager 102. The communications stack 100 comprises three layers: layer 104 (the highest layer), layer 106, and layer 108 (the lowest layer). The layers 104, 106, and 108 in the aggregate perform sufficient processing to pass data from one computer to another. Each layer 104, 106, and 108 performs a portion of the functionality necessary to transfer the data and each layer must typically reside on the same computer as the comstack manager 102. Each layer 104, 106 and 108 provides multiple functions that the adjacent layers must know about in order to invoke the functionality of the layer. The comstack manager 102 is responsible for starting the communications stack 100 and for maintaining the communications stack during its lifetime. In starting the communications stack 100, the comstack manager 102 first loads the lowest layer, layer 108, into memory. The comstack manager 102 knows the location of layer 108 because it has configuration information that specifies the name and location of the files containing the layer 108. Upon loading layer 108 into memory, layer 108 sends an indication to the comstack manager 102 of the next highest layer in the communications stack 100 that needs to be loaded. In other words, layer 108 indicates to the comstack manager 102 the location and names of the files containing layer 106. Upon receiving this information, the comstack manager 102 loads layer 106 into memory. After loading layer 106 into memory, the comstack manager 102 loads the highest layer, layer 104 into memory. The comstack manager 102 maintains configuration information which contains the location and names of the files containing layer 104. After loading the layers 104, 106, and 108 into memory, the comstack manager 102 initializes the layers and facilitates the communication between the layers for the lifetime of the communications stack 100.

The conventional comstack manager 102 has various limitations when reconfiguring the communications stack 100. The phrase "reconfiguring a communications stack" refers to providing a new communications stack having one or more different layers than the current communications stack. Reconfiguring a communications stack is necessary since different configurations of communications stacks usually provide different connectivity. That is, each type of communications stack typically establishes a connection to another computer using a different set of protocols. A "protocol" is a set of rules or standards designed to enable computers to connect with one another and to exchange information with as little error as possible. As such, a user may choose to connect to a computer using a different connectivity and hence, the communications stack will need to be reconfigured. One problem with reconfiguring the communications stack 100 in conventional systems is that the comstack manager 102 expects a communications stack having a fixed number of layers, such as exactly three layers. Many communications stacks do not have exactly three layers; but rather have more or fewer layers. This limitation prevents the comstack manager 102 from utilizing communications stacks having four or more layers since the comstack manager has no facility for handling these types of communications stacks. Further, this limitation makes it difficult to use communications stacks having fewer than three layers. In order to use a communications stack having fewer than three layers with the comstack manager 102, dummy layers must be inserted where a layer would otherwise have been located. For example, if a communications stack having only one layer is to be used, it would take the place of layer 108 and two dummy layers would have to be created to take the place of layers 104 and 106. Such a dummy layer acts as a pass through mechanism that unnecessarily increases the processing time required to transmit data from one computer to another.

A second problem with the conventional comstack manager 102 is that the location and names of the files containing layer 106 is hard coded into layer 108. As such, in order to substitute a different lowest layer into the communications stack 100 to replace layer 108, changes have to be made to the code of the layer 108. Based upon the above limitations, it is desirable to improve the reconfigurability of a communications stack.

SUMMARY OF THE INVENTION

The system described herein provides a method and system for reconfiguring a communications stack. The system provides a comstack manager that can be used with a communications stack having any number of layers. These layers can be located on different computers so as to spread the load of the communications stack across multiple computers. In addition, the comstack manager facilitates the reconfiguration of a communications stack without having to modify any of the layers of the communications stack or use dummy layers. Each layer provides a single entrypoint through which it communicates to its adjacent layers and the layers of the communications stack communicate with each other using a message transfer system that has a single entrypoint for transferring messages. The single entrypoint of the layer provides compatibility among the layers and flexibility since each layer is not bound to a specific definition of the functions provided by another layer. That is, each layer only needs to know how to access the single entrypoint which is the same for each layer. The comstack manager performs its processing by receiving configuration information at runtime. This configuration information contains an indication of each of the layers in the communications stack, a reference of their location which indicates whether the layer is located on the local computer or on a remote computer, and the ordering of the layers. After receiving the configuration information, the comstack manager of the system starts the communications stack. As such, in order to reconfigure the communications stack, all that needs to be done is to send the comstack manager new configuration information indicating either a new communications stack or one or more new layers in the communications stack. After receiving this information, the comstack manager will start each layer and facilitate communications between the layers.

In accordance with a first aspect of the present invention, a method is practiced in a data processing system for reconfiguring a communications stack comprising a number of layers for sending data to a remote computer. The communications stack is managed by a comstack manager. Under the control of the comstack manager, the method receives first data indicating the layers of a first communications stack and starts the first communications stack. Additionally, the method receives second data indicating the layers of a second communications stack having a different number of layers than the first communications stack and starts the second communications stack.

In accordance with a second aspect of the present invention, a data processing system is provided containing a memory and a processor. The memory further includes a communications stack comprising layers for receiving data and for sending the data to a remote computer. The layers form a sequence wherein the data is received into the communications stack by a first of the layers in the sequence and the data is transferred sequentially between the layers in the sequence until the data reaches a last one of the layers in the sequence. The last of the layers in the sequence sends the data to the remote computer. In addition, the memory includes a message transfer system for transferring the data between the layers of the communications stack. The message transfer system has a single entrypoint. The processor of the data processing system runs the communications stack and the message transfer system.

BRIEF DESCRIPTION OF THE DRAWINGS

FIG. 14 depicts a debug layer inserted into the communications stack of the preferred embodiment so as to facilitate the debugging of the communications stack.

DETAILED DESCRIPTION OF THE INVENTION

Figure 1:
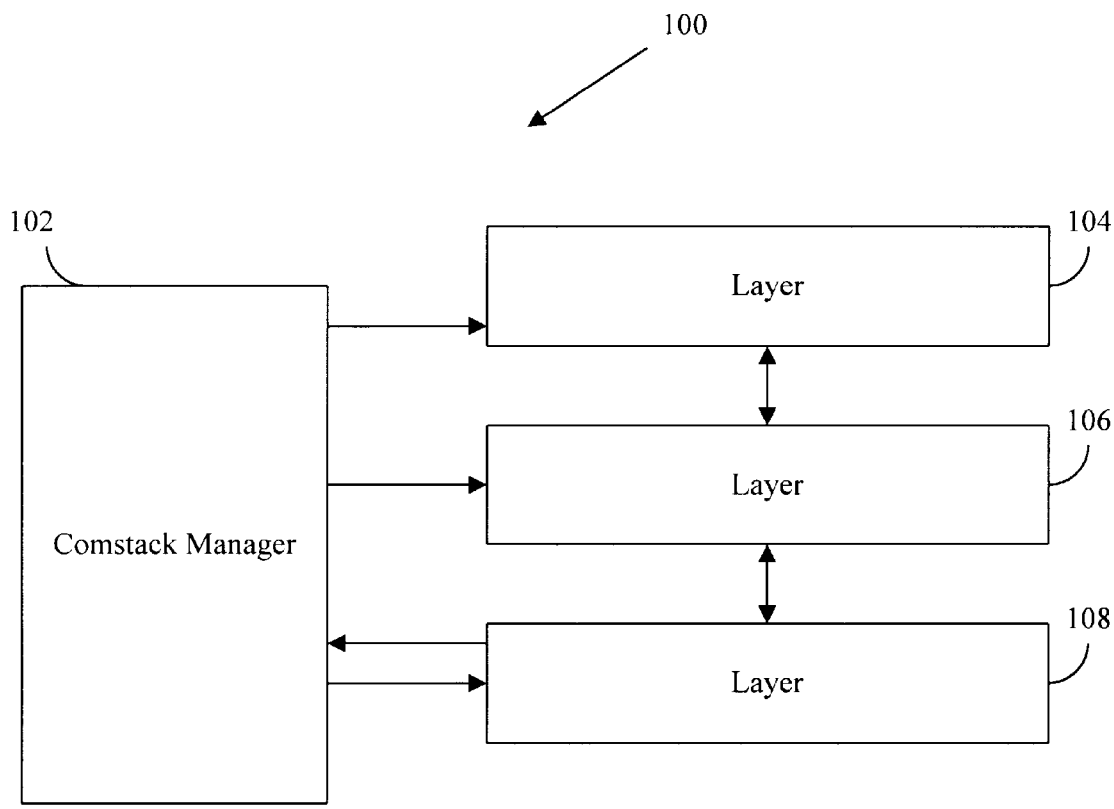
FIG. 1 depicts a conventional communications stack having three layers managed by a comstack manager.

A preferred embodiment of the present invention provides a method and system for reconfiguring a communications stack. The preferred embodiment provides a comstack manager that can be used with a communications stack having any number of layers. These layers can be located on different computers so as to spread the load of the communications stack across multiple computers. In addition, the comstack manager facilitates the reconfiguration of a communications stack without having to modify any of the layers of the communications stack. Each layer of the communications stack provides a single entrypoint through which it communicates to its adjacent layers and the layers of the communications stack communicate with each other using a message transfer system that has a single entrypoint for transferring messages. The single entrypoint of the layer provides compatibility among the layers and flexibility since each layer is not bound to a specific definition of the functions provided by another layer. That is, each layer only needs to know how to access the single entrypoint, which is the same for each layer.

The comstack manager of the preferred embodiment performs its processing by receiving configuration information at run time. This configuration information contains an indication of each of the layers in the communications stack, a reference to their location which indicates whether the layer is located on a local computer or on a remote computer, and the ordering of the layers. After receiving the configuration information, the comstack manager starts the communications stack. As such, in order to reconfigure the communications stack, all that needs to be done is to send the comstack manager new configuration information indicating either a new communications stack or one or more new layers in the communications stack. After receiving this information, the comstack manager will start each layer and facilitate communications between the layers.

The preferred embodiment is practiced in an object-oriented system wherein the processing of the system is performed by a number of objects. An "object" is a software construct that combines both data and behavior. The data is referred to as data members of the object and the behavior is performed by function members. The function members of the object act upon the data members of the object. Objects interact by invoking each other's function members. An object is an instance of a class. The object-oriented system in which the preferred embodiment operates is more clearly described in copending U.S. patent application Ser. No. 08/580,936, entitled "Method and System for Invoking Programmable, Shared Objects Using a Direct Memory Reference," assigned to a common assignee, which is hereby incorporated by reference and copending U.S. patent application Ser. No. 08/580,937, entitled, "Centralized Messaging System With a Filtering Mechanism," assigned to a common assignee, which is hereby incorporated by reference.

Objects in the object-oriented system can be arranged to form an inheritance hierarchy where one object ("derived object") inherits at least one other object ("inherited object"). The derived object and the inherited object form a parent-child relationship in which the derived object can access both the data members and the function members of the inherited object. In addition, the derived object inherits the implementation of the inherited object, which is known as "implementation inheritance." Implementation inheritance allows for the derived object to make use of the function members of the inherited object. For example, when the derived object receives a request to invoke a function member and the derived object does not support the function member, if the inherited object supports the function member, the function member of the inherited object is invoked. Additionally, the derived object can redefine a function member of an inherited object so that when the derived object receives a request to invoke the function member, the function member of the derived object is invoked instead of the function member of the inherited object. The derived object redefines a function member of the inherited object by implementing a function member having a similar name. When the derived object performs such a function redefinition, the derived object is said to have created an "overriding" function member.

In the object-oriented system in which the preferred embodiment operates, every object has a class object that represents a generic type of object and which contains certain information that is applicable to all objects of its type. This information includes an indication of the inherited objects in the object's inheritance hierarchy, as well as an indication of the location of the files where the code for the object is located. Each class object exposes two function members: CreateObject and DestroyObject. The CreateObject function member is responsible for creating an object of the type of the class object and the DestroyObject function member is responsible for deleting an object. The class objects are themselves objects and as such, class objects have their own inheritance hierarchy with a base class object at the base of the hierarchy. Therefore, if a class object wishes not to implement the CreateObject and DestroyObject function members, the class objects can take advantage of implementation inheritance and use the default behavior defined by the base class object.

Figure 2:
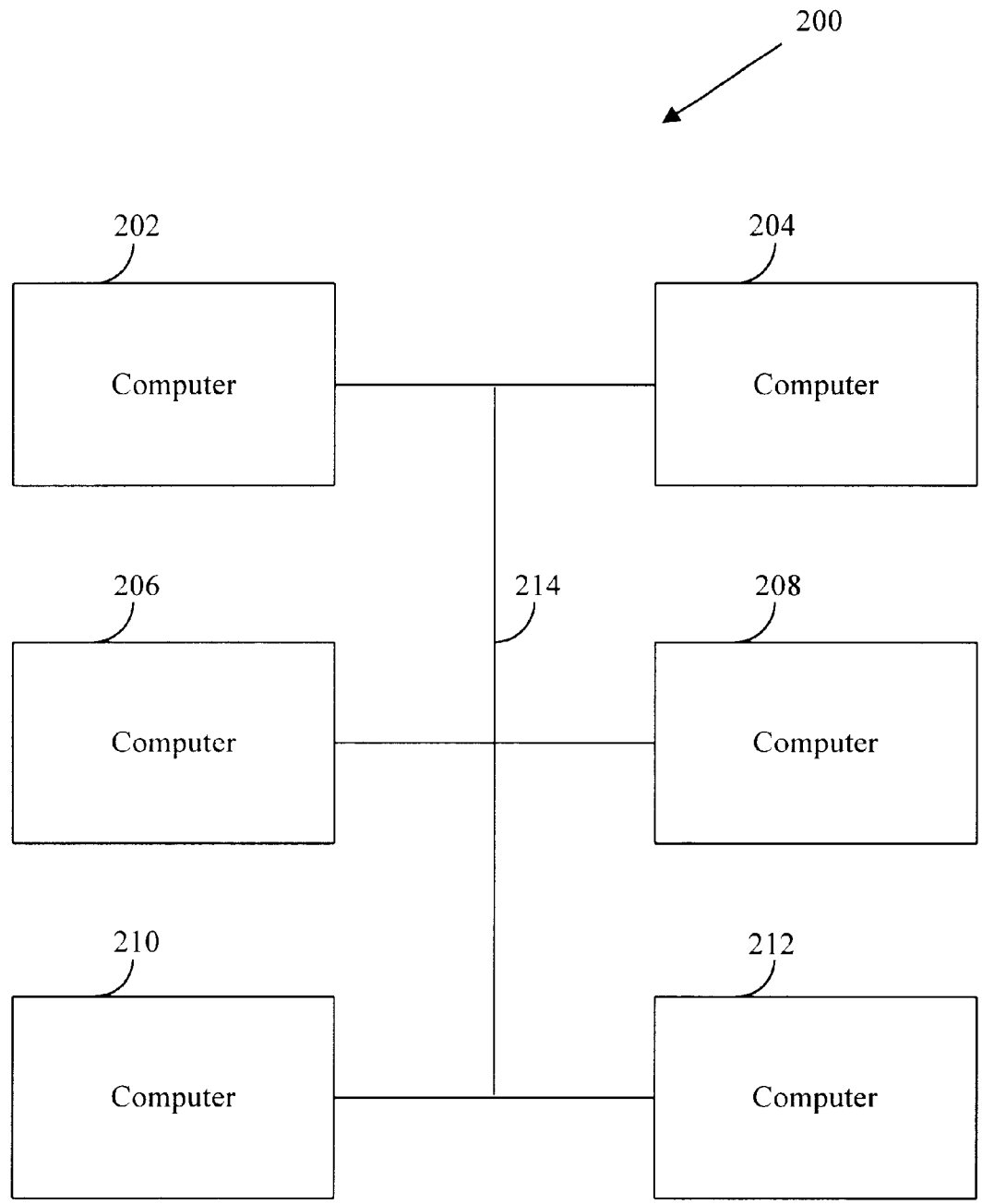
FIG. 2 depicts a data processing system that is suitable for practicing a preferred embodiment of the present invention.

A data processing system 200 that is suitable for practicing the preferred embodiment of the present invention is illustrated in FIG. 2. As used herein, the term "data processing system" refers to any device having a memory and a processor. The data processing system 200 contains a number of computers 202, 204, 206, 208, 210, and 212 that are interconnected via a network 214. The computers 202, 204, 206, 208, 210, and 212 in the preferred embodiment may be workstations, such as personal computers, or other computers, such as mainframe computers like the IBM 370. The network 214 utilized by the preferred embodiment is a local area network. However, one skilled in the art will appreciate that the present invention may be used with a wide area network.

Figure 3:
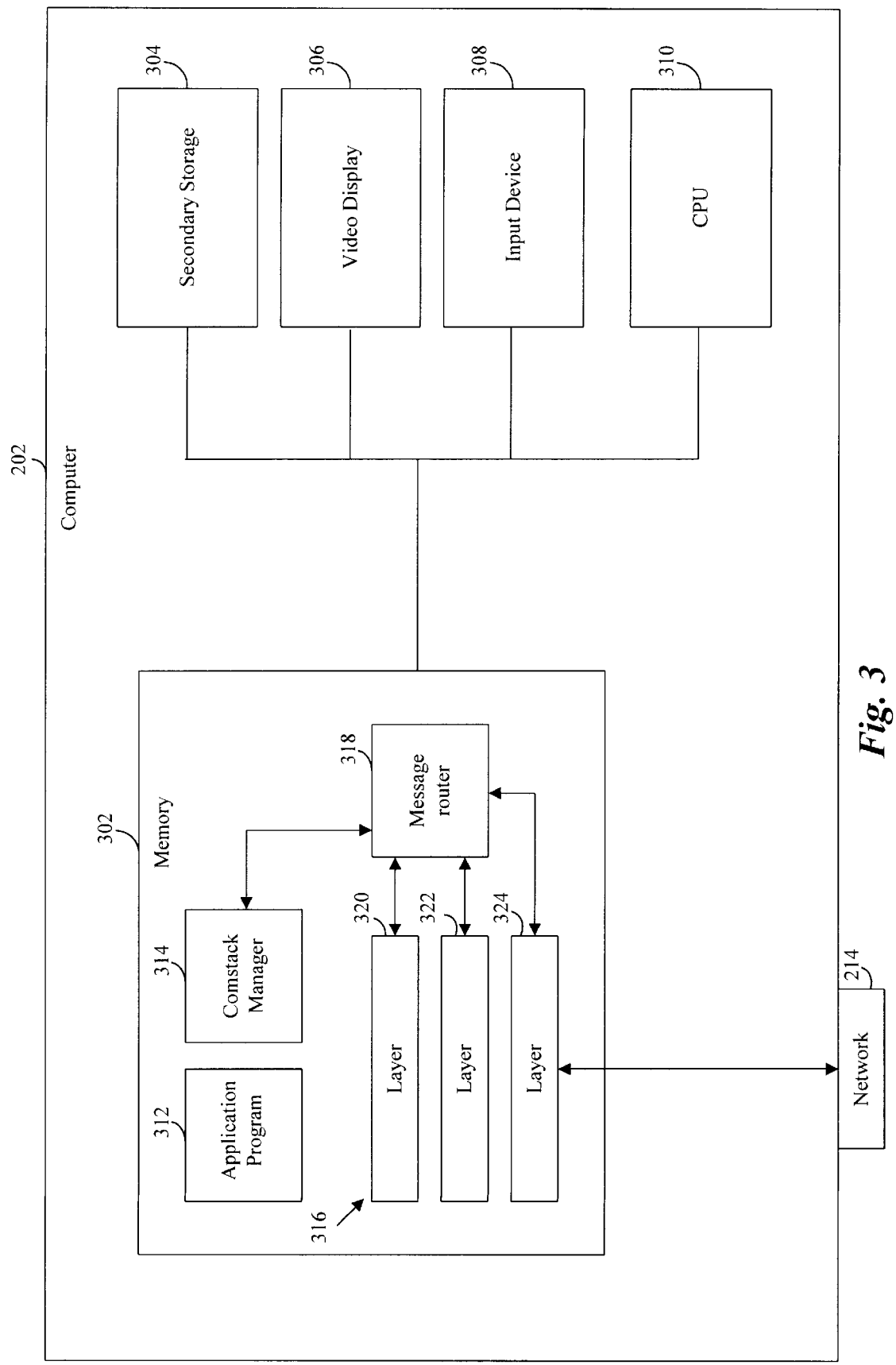
FIG. 3 depicts a computer of FIG. 2 in greater detail.

FIG. 3 illustrates the computer 202 of FIG. 2 in greater detail.

Computer 202 contains a memory 302, a secondary storage device 304, a video display 306, an input device 308, and a central processing unit (CPU) 310. The memory 302 contains an application program 312, a comstack manager 314, a communications stack 316, and a message router 318. The application program 3 12 interacts with a user of the computer 202 and performs terminal emulation of one or more of the computers 204, 206, 208, 210, and 212 on the network 214. The comstack manager 314 is responsible for starting the communications stack 316 and for managing the communications stack during its lifetime. The communications stack 316 contains three layers 320, 322, 324 for transferring data received from the application program 312 via the comstack manager 314 across the network 214 to a remote computer such as one of computers 204–212. Although a communications stack 316 having three layers 320, 322 and 324 is depicted, in accordance with the preferred embodiment, communications stacks having additional or fewer layers can be used. In addition, although the layers 320, 322 and 324 are depicted on computer 202, in accordance with the preferred embodiment, each layer may be located on a separate computer. The layers 320, 322, and 324 receive the data to be transferred from the message router 318 and transfer the data between each layer using the message router 318. The message router 318 provides a single entrypoint for transferring the data. That is, the message router 318 contains a single function that is used for transferring data from a source of the data to a destination for the data. This single entrypoint simplifies the code needed for communications between the source and the destination. The layers of the communications stack 316 and the comstack manager 314 are implemented as objects in the preferred embodiment.

The message router 318 supports an application programming interface (API) in order to provide access to its functionality. Some of the functions on this API include an AomNewRef function, an AomDeleteRef function, and an AomOp function. The AomNewRef function is invoked to return a reference to an object. A reference to an object is used by the message router 318 to send a message to the object. The AomNewRef function receives as a parameter a character string containing both the name of the object and the name of the computer on which the object is located. After receiving this and other input, the AomNewRef function loads the object into memory 302 and returns a reference to the object that is used for communication with the object. The AomNewRef function and, more generally, the processing of the message router are more clearly described in U.S. patent application Ser. No. 08/580,937, entitled "Centralized Messaging System With a Filtering Mechanism," which has been incorporated by reference and U.S. patent application Ser. No. 08/580,936, entitled "Method and System for Invoking Programmable, Shared Objects Using a Direct Memory Reference," which has been incorporated by reference.

The AomDeleteRef function receives a reference to an object and deletes the reference. If the reference that was deleted was the last outstanding reference to the object, the object is removed from memory 302 and stored onto the secondary storage device 304.

The AomOp function acts as the single entrypoint of the message router 318 for transferring messages in the data processing system. The AomOp function receives as input the object reference for a destination object as well as an identifier of a message to be transferred to the destination object. The messages transferred by the message router 318 reflect the invocation of a function member of an object. As such, the identifier of the message indicates a function member to be invoked. All function members in the system have a predefined identifier. The message router 318, upon receiving this information, transfers the message to the destination object whether the destination object is on the local computer or on a remote computer. The message router 318 of the preferred embodiment is implemented as a dynamically linked library (DLL) that is loaded into the entities, such as a computer program, that use its services at run time.

Figure 4:
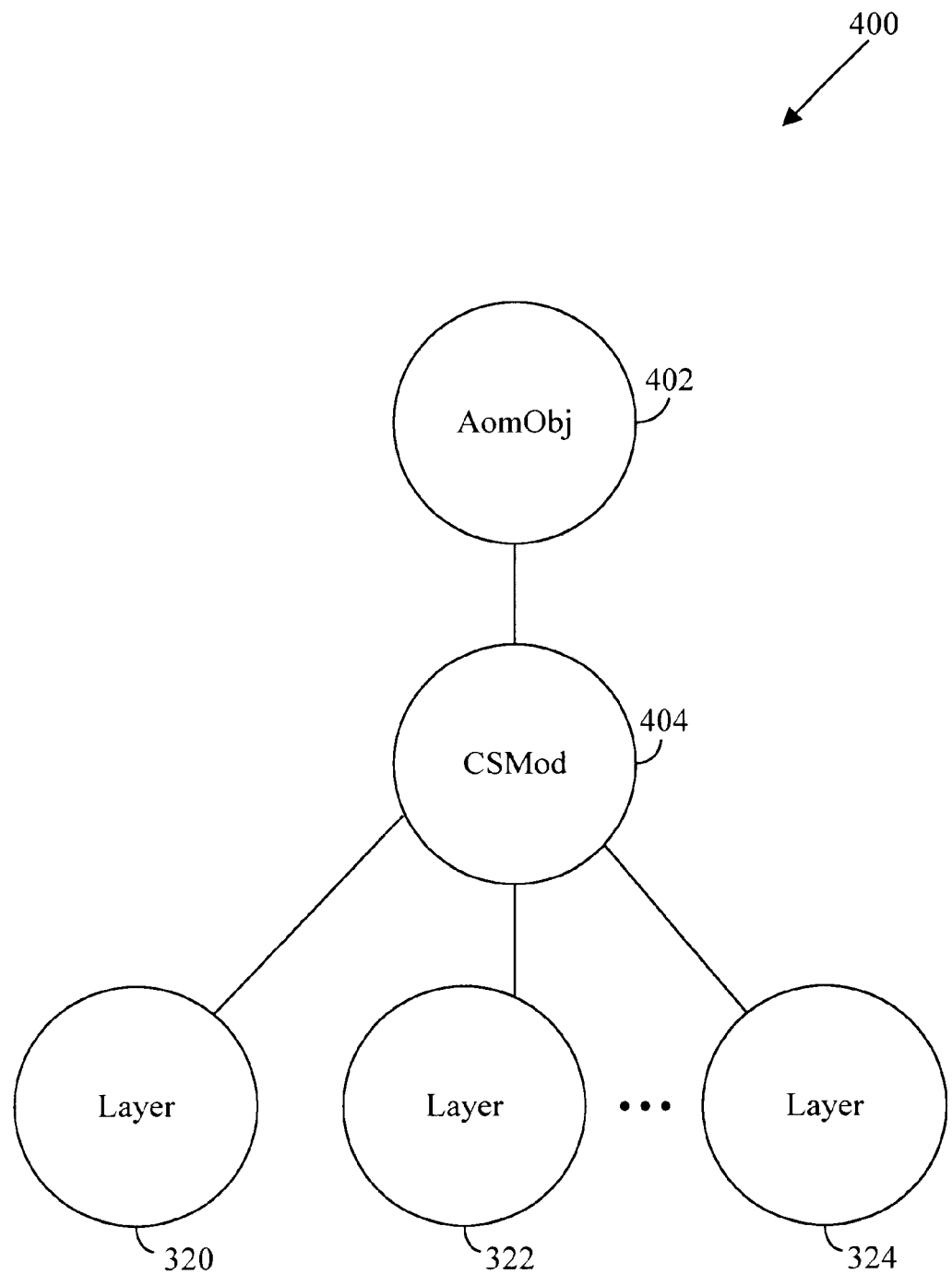
FIG. 4 depicts the inheritance hierarchy of the layers of the preferred embodiment.

FIG. 4 depicts an inheritance hierarchy 400 of the communications stack 316 of the preferred embodiment. The inheritance hierarchy 400 has an AomObj 402 object at its base. The AomObj 402 is the base object within the system from which all other objects are derived. A CSMod object 404 directly inherits the AomObj 402 object and defines default behavior for each of the layers 320, 322 and 324. As previously stated, the layers 320, 322 and 324 are objects. The layers 320, 322 and 324 directly inherit the CSMod object 404. Each of the layers 320, 322 and 324 may choose to use the default behavior provided by the CSMod object 404 or may choose to override the default behavior and provide additional functionality.

Each layer 320, 322 and 324 exposes a "Send" and a "Recv" function member. The Send function member receives data as a parameter. The Send function member performs protocol-specific processing on the data and either invokes the Send function member of the next lower layer or sends the data across the transfer medium if the layer is the bottom layer. An example of protocol-specific processing is adding a protocol-specific header to the data. The Send function member invokes the Send function member of the next lower layer by invoking the AomOp function. As previously stated, the AomOp function is the single entrypoint of the message router 318 that is used for transferring messages. The Recv function member is invoked when a layer wishes to send data to a next higher layer. When a layer receives data and wants to pass it to the next higher layer, it invokes the Recv function member of the higher layer and passes the data. The Recv function member performs protocol specific processing, such as stripping off a protocol header, and invokes the Recv function of the next higher layer. One skilled in the art will appreciate that additional function members may be provided by a layer depending on the protocol used by the layer.

Each layer 320, 322 and 324 is also derived from two interface classes. One interface class is specific to the protocol used between the layer and the next higher layer ("up interface class") and one interface class is specific to the protocol used between the layer and the next lower layer ("down interface class"). The up interface class defines a Recv function that is used for sending data to the next higher layer in a specific format. As such, when sending data to the next higher layer, the Recv function invokes the Recv function member of the next higher layer using the AomOp function. The format of the data is specific to the protocol used between the two layers. The down interface class defines a Send function that is used for sending data in a protocol-specific format to a next lower layer. The Send function of the down interface class invokes the Send function member of the next lower layer using the AomOp function.

The CSMod object contains a number of data members and function members that are accessible by the layers that are derived from it. The data members of the CSMod object include a DownOID data member and an UpOID data member. The DownOID data member contains the object name of the adjacent layer that is immediately below the present layer in the sequence of layers in the communications stack. The UpOID data member contains the object name of the adjacent layer that is immediately above the present layer in the communications stack. The CSMod object includes various function members such as a GetDownOid function member, a SetDownOid function member, a GetUpOid function member, a SetUpOid function member, an OpenStack function member, a StartStack function member, a StopStack function member, and a CloseStack function member. The GetDownOid function member returns the DownOID data member of the CSMod object to the caller. The SetDownOid function member sets the DownOID data member of the CSMod object. The GetUpOid function member retrieves the object name stored in the UpOID data member. The SetUpOid function member receives an object name as input and stores the object name as the UpOID data member. The OpenStack function member is used to initialize a layer. The StartStack function member establishes a connection. The StopStack function member terminates a connection and the CloseStack function member performs cleanup processing on a layer.

The OpenStack, StartStack, StopStack and CloseStack function members are further described below. By providing these function members, each layer facilitates the reconfigurability of the communications stack in accordance with the preferred embodiment. Although the CSMod object 404 defines default behavior for the function members, the layers 320, 322 and 324 usually define an overriding function member to perform additional or different functionality. As such, the following description of these function members focuses on the actual functionality that the layers 320, 322 and 324 need for the function members to perform.

Figure 5:
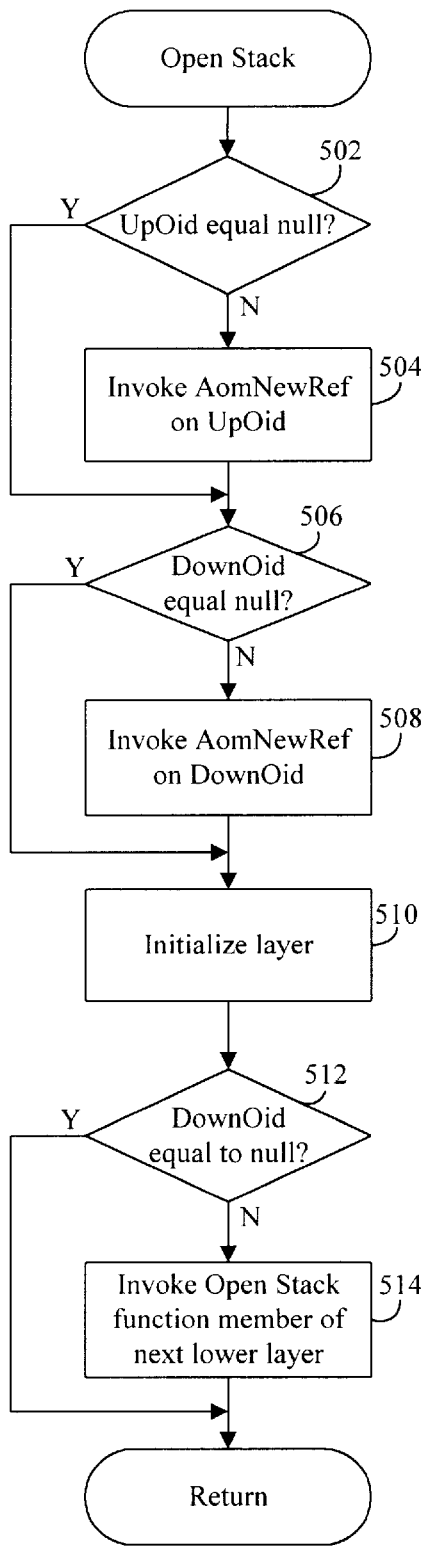
FIG. 5 depicts a flowchart of the steps performed by the OpenStack function member of the CSMod object depicted in FIG. 4.

FIG. 5 depicts a flowchart of the steps performed by the OpenStack function member of the CSMod object 404. The first step performed by the OpenStack function member is to determine if the UpOID data member is equivalent to null (step 502). If the UpOID data member is equivalent to null, this indicates that the layer is the top layer in the communication stack 316 and there is no higher layer. This determination is made by invoking the GetUpOid function member. If it is determined that the UpOID data member is equivalent to null, processing continues to step 506. However, if the UpOID data member is not equivalent to null, the OpenStack function member invokes the AomNewRef function of the message router 318 to pass the UpOID data member as a parameter (step 504). In this step, the AomNewRef function will return an object reference to the next highest layer in the communications stack.

Next, the OpenStack function member determines if the DownOID data member is equivalent to null (step 506). This determination is made by invoking the GetDownOid function member and examining the return code. The DownOID data member may be set to null if this layer is the bottom layer in the communications stack 316. If the DownOID data member is equivalent to null, the processing continues to step 510. However, if the DownOID data member is not equivalent to null, the 20 OpenStack function member invokes the AomNewRef function of the message router passing the DownOID data member as a parameter (step 508). In step 508, the AomNewRef function will return an object reference to the next lowest layer in the communications stack. Next, the OpenStack function member initializes the layer (step 510). In this step, the OpenStack function member allocates sufficient memory to be used within the layer as well as other initialization, such as initializing its internal state machine. After initializing the layer, the OpenStack function member determines if the DownOID data member is equivalent to null (step 512). If the DownOID data member is equivalent to null, the OpenStack function member returns. However, if the DownOID data member is not equivalent to null, the OpenStack function member invokes the OpenStack function member of the adjacent lower layer (step 514). The OpenStack function member of the adjacent lower layer is invoked by using the AomOp function of the message router 318 passing the object reference to the lower layer as a parameter. This object reference was obtained in step 508. At this point in the processing, certain post processing functionality may be performed by the OpenStack function member. Such post processing functionality includes invoking the services of a lower layer. It can be ensured that the lower layer is ready to perform the services since its OpenStack function member has already been invoked. After invoking the OpenStack function member and waiting for it to return, processing returns.

Figure 6:
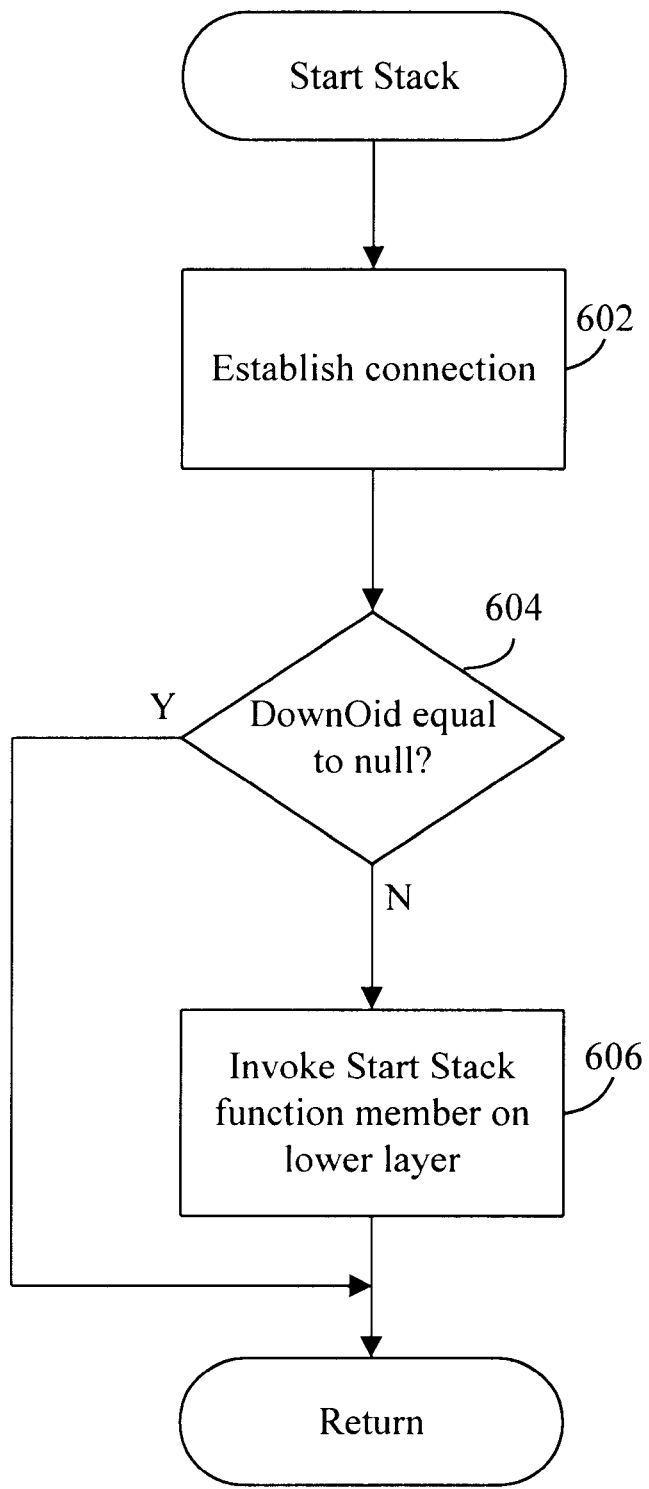
FIG. 6 depicts a flowchart of the steps performed by the StartStack function member of the CSMod object depicted in FIG. 4.

The StartStack function member performs processing to establish a connection. Thus, after the StartStack function member has completed its processing, a connection from the local computer to the remote computer is established. FIG. 6 depicts a flowchart of the steps performed by the StartStack function member. The first step performed by the StartStack function member is to establish a connection (step 602). In this step, the StartStack function member performs whatever processing is necessary to establish the connection. For example, the bottom layer will establish a network connection to a remote computer and higher layers may do nothing. As part of the processing, the bottom layer will send a "connected message" up the communications stack on a separate thread to all of the above layers to indicate that a connection has been established. Other processing performed in establishing a connection is specific to the protocol used and is typically well-known. After performing processing to establish a connection, the StartStack function member determines if the DownOID data member is equivalent to null (step 604). If the DownOID data member is equivalent to null, processing returns. However, if the DownOID data member is not equivalent to null, the StartStack function member invokes the StartStack function member of the adjacent lower layer (step 606). In this step, the StartStack function member accesses the object reference that was previously stored for the lower layer and utilizes the AomOp function of the message router 318 to invoke the StartStack function member. After invoking the StartStack function member, processing returns.

Figure 7:
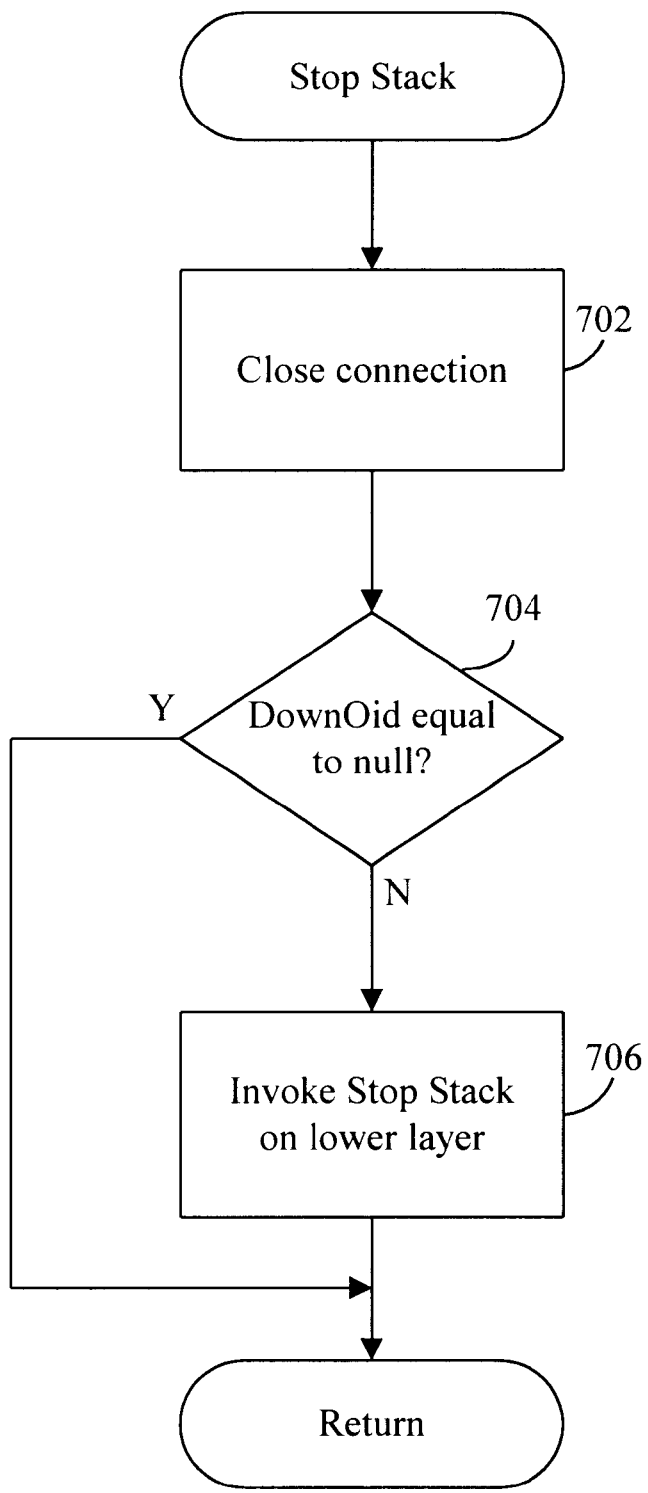
FIG. 7 depicts a flowchart of the steps performed by the StopStack function member of the CSMod object depicted in FIG. 4.

The StopStack function member is utilized to close a connection. FIG. 7 depicts a flowchart of the steps performed by the StopStack function member. The first step performed by the StopStack function member is to close the connection that was opened by the StartStack function member (step 702). If the StopStack function member is invoked by a layer higher than the bottom layer, the StopStack function member may not have to perform any processing in this step. The bottom layer, after closing the connection, will send a "connection failure message" up the communications stack to indicate to the higher layers that the connection has been terminated. After closing the connection, the StopStack function member determines if the DownOID data member is equivalent to null (step 704). If the DownOID data member is equivalent to null, processing returns. However, if the DownOID data member is not equivalent to null, the StopStack function member invokes the StopStack function member of the next lower layer (step 706). In this step, the StopStack function member utilizes the AomOp function of the message router 318 and passes the object reference to the next lower layer. At this point in the processing, certain post processing functionality may be performed by the StopStack function member. Such post processing may include freeing the resources that were necessary to receive messages from the lower layers. After invoking the StopStack function member, processing returns.

Figure 8:
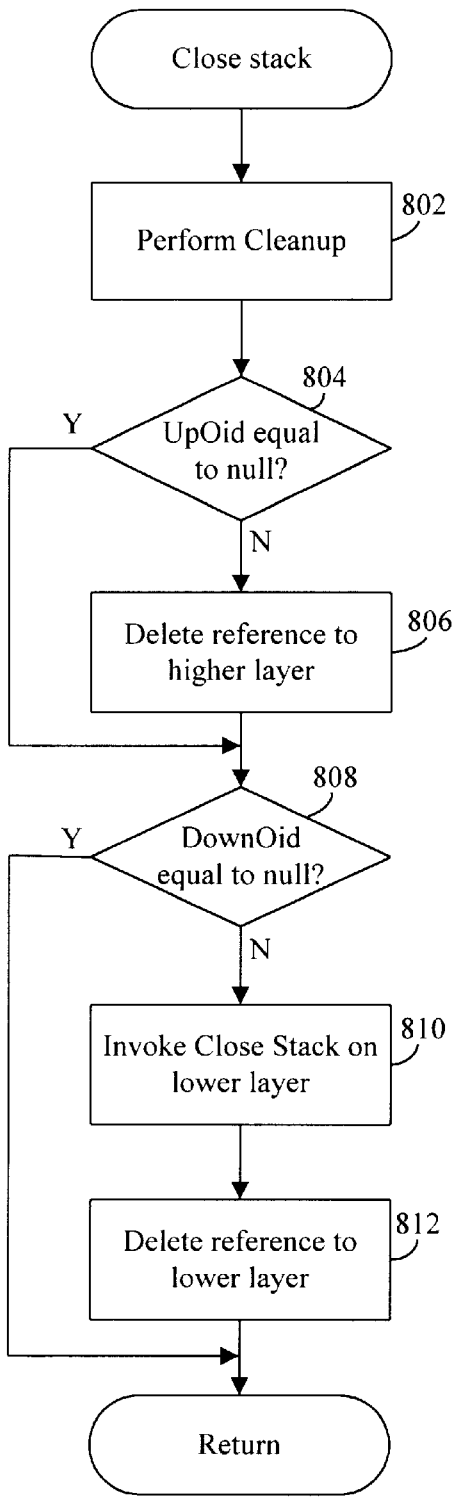
FIG. 8 depicts a flowchart of the steps performed by the CloseStack function member of the CSMod object depicted in FIG. 4.

FIG. 8 depicts a flowchart of the steps performed by the CloseStack function member. The first step performed by the CloseStack function member is to perform cleanup processing (step 802). In this step, the CloseStack function member releases any handles to devices or files and releases any allocated memory. Next, the CloseStack function member determines if the UpOID data member is equivalent to null (step 804). If the UpOID data member is equivalent to null, processing continues to step 808. If the UpOID data member is not equivalent to null, the CloseStack function member deletes the reference to the higher layer by invoking the AomDeleteRef function of the message router (step 806). After deleting the reference, the CloseStack function member determines if the DownOID data member is equivalent to null (step 808). If the DownOID data member is equivalent to null, processing returns. If the DownOID data member is not equivalent to null, the CloseStack function member invokes the CloseStack function member of the next lower layer (step 810) and deletes the reference to the lower layer when the CloseStack function member of the lower layer returns (step 812). At this point in the processing, certain post processing functionality may be performed by the CloseStack function member. Such post processing may include freeing the resources that were necessary to receive messages from the lower layers. After deleting the reference to the lower layer, processing returns.

The comstack manager 314 supports various function members including: a Write function member, a Read function member, a CreateConnection function member, an OpenConnection function member, a CloseConnection function member, and a DestroyConnection function member. The Write function member sends data from the comstack manager to the top layer in the communications stack 316 for transfer to the remote computer. The Read function member receives data from the top layer of the communications stack and passes it to the application program. The Create Connection function member initializes the comstack manager. The OpenConnection function member establishes a connection to a remote computer. The CloseConnection function member terminates a connection and the DestroyConnection function member performs cleanup processing.

Figure 9:
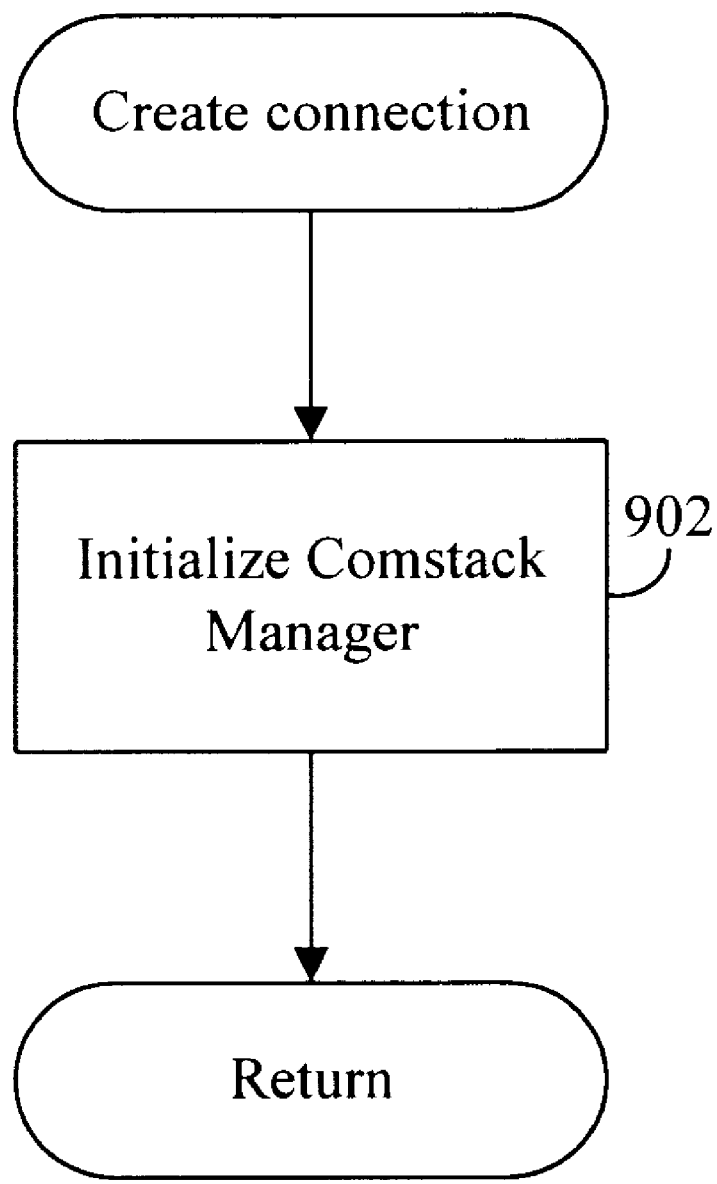
FIG. 9 depicts a flowchart of the steps performed by the CreateConnection function member of the comstack manager of the preferred embodiment.

The processing of the CreateConnection function member is depicted in the flowchart of FIG. 9. The CreateConnection function member initializes the comstack manager (step 902). This initialization sets internal values, initializes internal states and allocates memory for use during the processing of the comstack manager.

Figure 10:
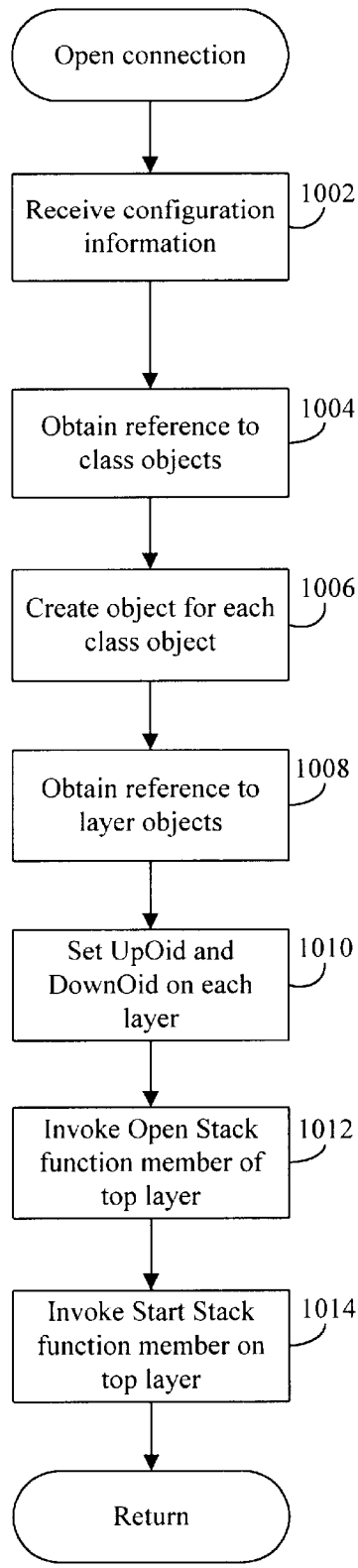
FIG. 10 depicts a flowchart of the steps performed by the OpenConnection function member of the comstack manager of the preferred embodiment.

A flowchart of the steps performed by the OpenConnection function member is depicted in FIG. 10. The OpenConnection function member first receives configuration information (step 1002). The configuration information received by the OpenConnection function member is a list of the class objects of each of the layers 320, 322 and 324 and the computer on which the layer is located. For example, the configuration information may be "//Rodan/classobject1; //Jupiter/classobject2; //Pluto/classobject3". This configuration information indicates that "classobject1" is the class object for the first layer (the top layer) and it is located on the "Rodan" computer. The class object for the second layer is "classobject2" and the class object for the third layer (the bottom layer) is "classobject 3," which are located on computers "Jupiter" and "Pluto," respectively. Thus, in order to utilize layers located on different computers, all that needs to be done is to indicate the computer on which each layer is located and the name of each layer's class object. After specifying this information, the preferred embodiment will start each layer and manage the communications stack even though one or more layers are located on a different computer. After receiving the configuration information, the OpenConnection function member obtains an object reference to the class objects (step 1004). In this step, the OpenConnection function member invokes the AomNewRef function, passing the object name and computer name into the AomNewRef function in order to obtain an object reference. After obtaining the object reference, the OpenConnection function member invokes the CreateObject function member for each class object (step 1006). In this step, the OpenConnection function member utilizes the AomOp function and passes in the object reference with the identifier of the CreateObject function member. The CreateObject function member of the class object will then create a layer object on either the local or the remote computer depending on where the class object is located. After creating a layer object for each class object, the OpenConnection function member obtains a reference to the layer objects (step 1008). In this step, the OpenConnection function member invokes the AomNewRef function using the object names of the layer objects.

After obtaining the reference, the OpenConnection function member sets the UpOID data member and the DownOID data member on each layer to refer to the previous layer and the next layer, respectively (step 1010). In this step, the OpenConnection function member invokes the SetUpOid and SetDownOid function members of each object in order to set these data members. After setting the UpOID data member and DownOID data members, the OpenConnection function member invokes the OpenStack function member of the top layer (step 1012). The OpenStack function member of the top layer will perform initialization and invoke the OpenStack function member of the adjacent lower layer. The OpenStack function member blocks waiting until the bottom layer has processed the OpenStack function member. As such, there is a cascading effect since each layer blocks waiting for the lower layer's OpenStack function member to return. The top layer's OpenStack function member does not return until all of the lower layer's OpenStack function members have returned. After invoking the OpenStack function member of the top layer, the OpenConnection function member invokes the StartStack function member of the top layer (step 1014). In this step, the StartStack function member of the top layer will open a connection and invoke the StartStack function member of the adjacent lower layer. The top layer's StartStack function member will block waiting until the adjacent lower layer's StartStack function member has completed processing. After invoking the StartStack function member of the top layer, processing returns.

Figure 11:
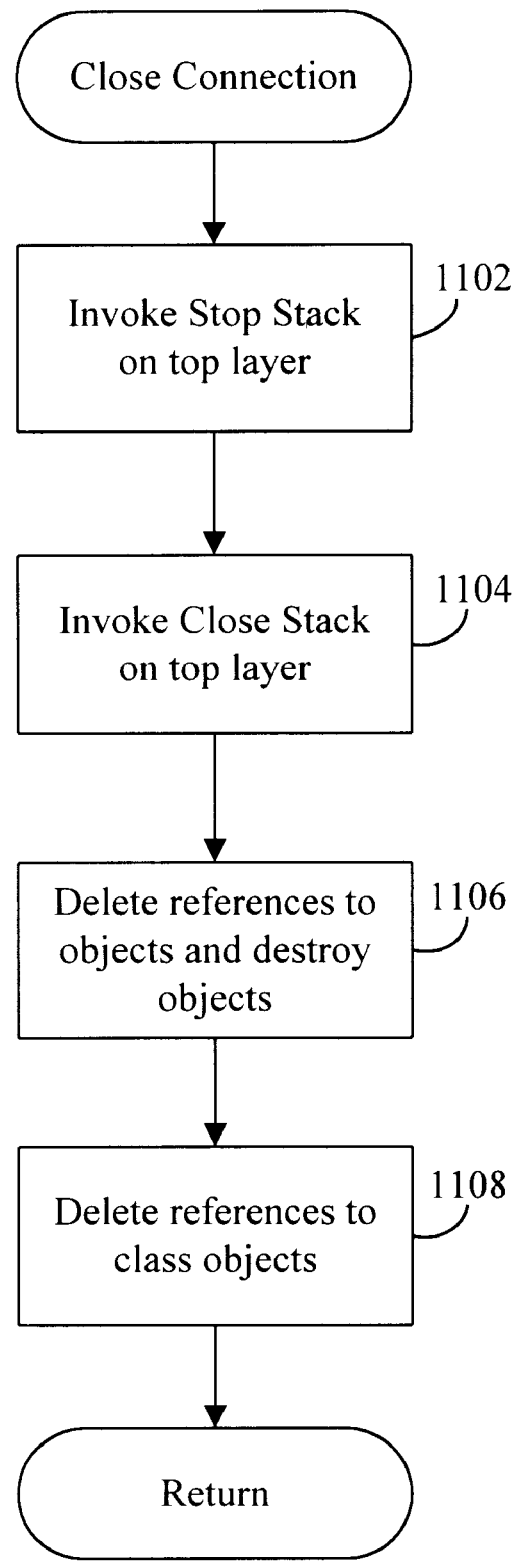
FIG. 11 depicts a flowchart of the steps performed by the CloseConnection function member of the comstack manager of the preferred embodiment.

FIG. 11 depicts a flowchart of the steps performed by the CloseConnection function member. The CloseConnection function member first invokes the StopStack function member of the top layer (step 1102). The StopStack function member of the top layer will close the connection and invoke the StopStack function of the next lower level. After invoking the StopStack function member of the top layer, the CloseConnection function member invokes the CloseStack function member of the top layer (step 1104). In this step, the CloseStack function member performs cleanup processing and invokes the CloseStack function member of the next lower layer. Next, the CloseConnection function member deletes the references to the layer objects and destroys the layer objects (step 1106). In this step, the CloseConnection function member invokes the AomDeleteRef function for each object created (i.e., the layers) and destroys the objects by invoking the DestroyObject function member of the class object for each object. After deleting the references and destroying the objects, the CloseConnection function member deletes the references to the class objects (step 1108). In this step, the CloseConnection function member invokes the AomDeleteRef function to delete the references. After deleting the references, processing returns.

Figure 12:
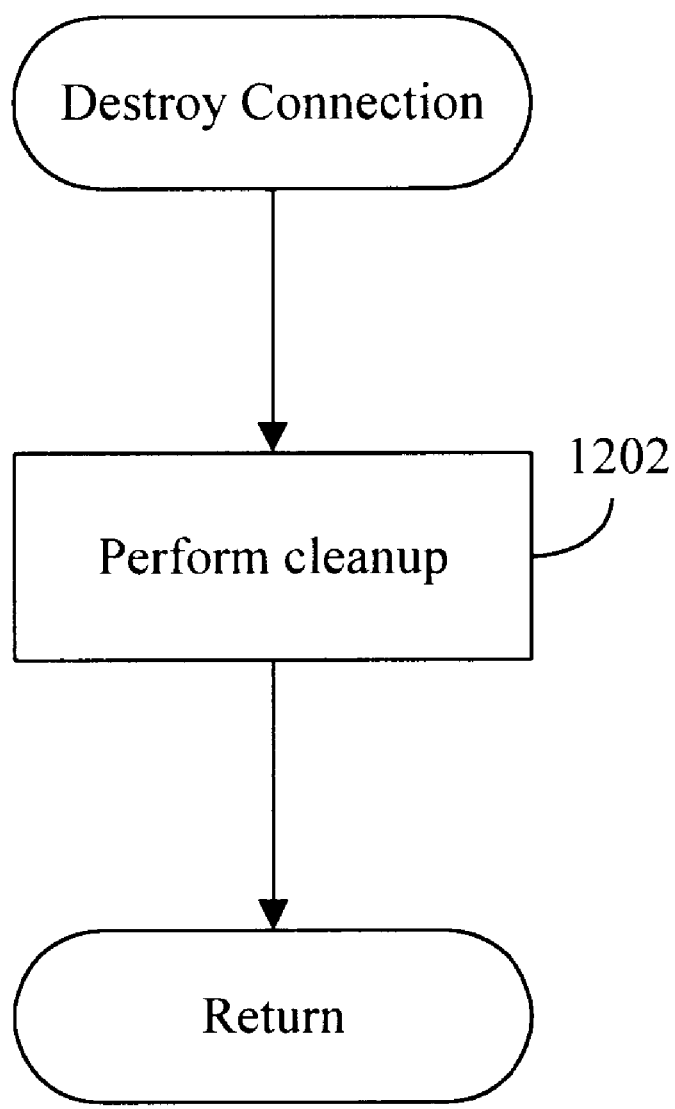
FIG. 12 depicts a flowchart of the steps performed by the DestroyConnection function member of the comstack manager of the preferred embodiment.

FIG. 12 depicts a flowchart of the steps performed by the DestroyConnection function member of the comstack manager 314 of the preferred embodiment. The DestroyConnection function member performs cleanup processing (step 1202). In performing cleanup processing, the function frees any allocated memory and releases any handles to devices or files.

Figure 13A:
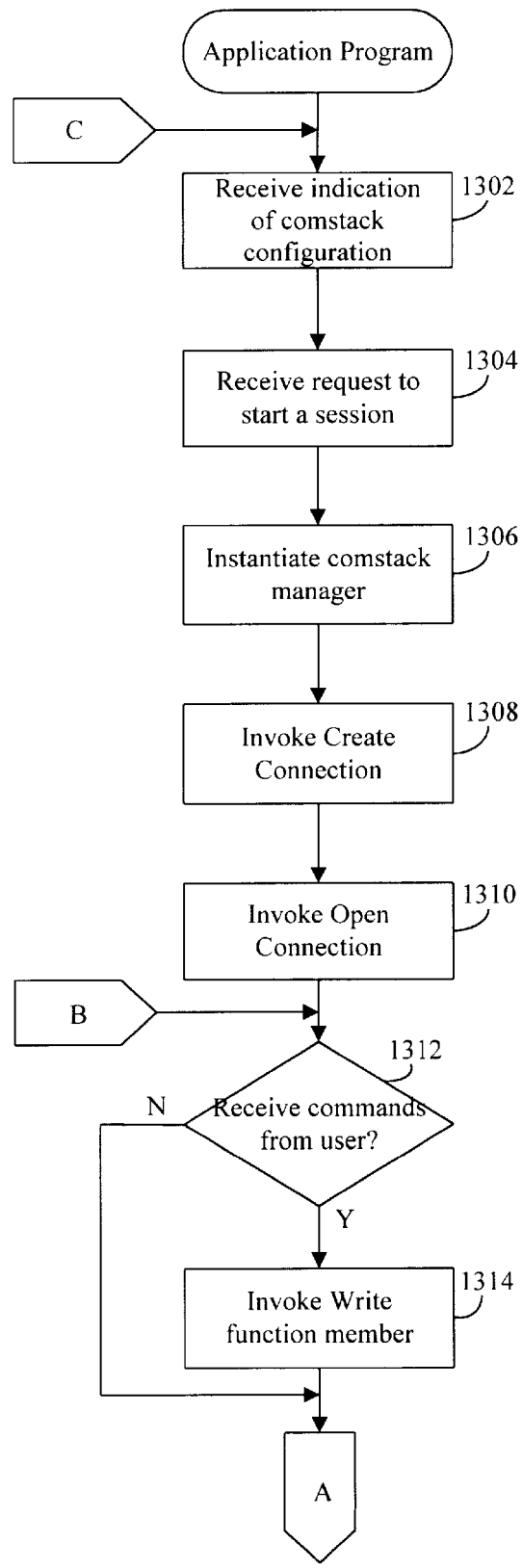
FIGS. 13A and 13B together depict a flowchart of the steps performed by an application program utilizing the comstack manager of the preferred embodiment.
Figure 13B:
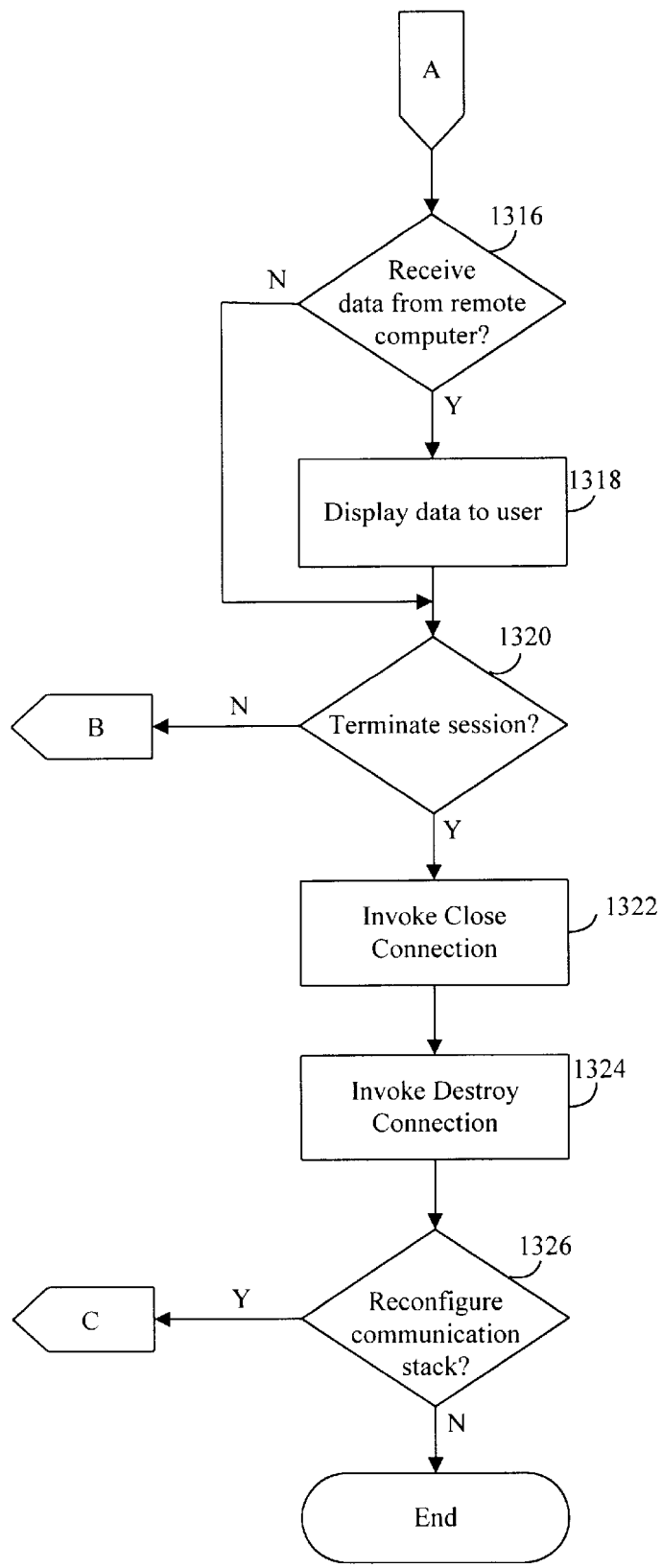

FIGS. 13A and 13B in combination depict a flowchart of the steps performed by an application program utilizing the comstack manager 314 of the preferred embodiment. The application program of the preferred embodiment performs terminal emulation of the remote computer. That is, the local computer is a personal computer and the remote computer is another type of computer, such as an IBM 370 Thus, upon its invocation, the application program receives commands from a user and transmits these commands to the remote computer, and receives responses to the commands from the remote computer and sends the responses to the user. The first step performed by the application program is to receive an indication of the communications stack configuration (step 1302). In this step, the user selects one of a number of prestored communications stack configurations that contains the configuration information as previously described. One skilled in the art will appreciate that, instead of prestored configuration information, the user can use the present invention with dynamically created configuration information. After receiving an indication of the communications stack configuration, the application program receives a request to start a session of terminal emulation (step 1304). In this step, the user indicates a request to start a session by issuing a command to the application program.

After receiving the request to start a session, the application program instantiates the comstack manager 314 (step 1306). In this step, the application program invokes the "new" operator on the comstack manager which invokes a constructor on the comstack manager. As previously stated, the comstack manager is an object. The constructor invokes the AomNewRef function to obtain an object reference to the comstack manager and loads the comstack manager into memory. The constructor also performs initialization on the comstack manager to ready it for its processing. Next, the application program invokes the CreateConnection function member of the comstack manager (step 1308). In this step, the application program invokes the AomOp function utilizing the object reference of the comstack manager as well as an identifier of the CreateConnection function member. The CreateConnection function member initializes the communications stack 316. After invoking the CreateConnection function member, the application program invokes the OpenConnection function member (step 1310). In this step, a connection is established between the local computer and the remote computer.

After invoking the OpenConnection function member, the application program determines whether it has received commands from the user for transmittal to the remote computer (step 1312). If the application program has not received commands from a user, processing continues to step 1316 in FIG. 13B. However, if the application program has received commands from a user, the application program invokes the Write function member of the comstack manager (step 1314). The Write function member sends the commands to the remote computer for processing. The Write function member performs this processing by sending the data to the top layer using the AomOp function of the message router 318. In using the AomOp function, the Write function member invokes the "Send" function member of the top layer, which is responsible for sending the data through the communications stack in accordance with a specific protocol.

After invoking the Write function member, the application program determines whether it has received data from the remote computer (step 1316 in FIG. 13B). If the application program did not receive data from the remote computer, processing continues to step 1320. However, if the application program did receive data from the remote computer, the application program displays the data to the user (step 1318). The data that was received by the application program is typically a response to a command sent by a user. The data is received by invoking the Read function member of the comstack manager using the AomOp function. The Read function member passes data to the application program that was received from the top layer. Although the Write function member is described as being invoked before the Read function member, it should be appreciated that multiple invocations of the Write function member and the Read function member may be performed in any order.

After displaying the data to the user, the application program determines whether the user would like to terminate the session (step 1320). If the user has not indicated to terminate the session, processing continues to step 1312 in FIG. 13A where the user may input more commands to the application program. If, however, the user has decided to terminate the session, the application program invokes the CloseConnection function member of the comstack manager (step 1322). The CloseConnection function member will then close the connection. After closing the connection, the application program invokes the DestroyConnection function member of the comstack manager (step 1324). In this step, the comstack manager performs cleanup processing. After invoking the DestroyConnection function member, the application program determines if the user would like to reconfigure the communications stack (step 1326). If the user indicates that it would like to reconfigure the communications stack, processing continues to step 1302 in FIG. 13A where the user can select a new communications stack having one or more layers that are different from the previous communications stack. If the user does not wish to reconfigure the communications stack, processing ends.

Another aspect of the preferred embodiment of the present invention involves facilitating debugging of the communications stack. For example, due to the flexibility of the preferred embodiment, a developer can develop a debug layer to be inserted into the communications stack 316 to act as a mere pass through mechanism in which data is passed through the debug layer. During the pass through, the debug layer can display the data to the user that is being transferred up and down the communications stack. Such a debug layer may also store the data into a log file. By displaying or logging the data that is transferred up and down the communications stack, the debugging of the communications stack is facilitated since a user can trace the data being sent up and down the communications stack and notice any incorrect data that may cause an exception to occur.

FIG. 14 depicts the communications stack 316 containing a debug layer 1402. Due to the flexibility of the preferred embodiment, in order to insert the debug layer 1402 into the communications stack, all that needs to be done is to insert an indication of the name and location of a class object that would create the debug layer object into the configuration information that is sent to the comstack manager 314 by the application program 312. After inserting this information, each layer including the debug layer will be started and communications will be facilitated through each layer as if the debug layer were a normal layer. The debug layer exposes a Send function member that merely displays the data and passes it to the next lower layer. The debug layer also exposes a Recv function member that displays the data and passes it to the next higher layer. As such, the debug layer 1402 will receive data from the next higher layer 320, display the data to the user, and pass the data to next lower layer 322. In addition, the debug layer 1402 will receive data from layer 322, display the data to the user, and pass the data to layer 320. The debug layer 1402 does not have to be concerned with any protocols that are being used since the debug layer is not changing any information that would normally have been transferred between layers 322 and layers 320 (i.e., the debug layer is a straight pass-through mechanism). It should be appreciated that the debug layer 1402 can be inserted between layers 322 and 324 or an additional debug layer could be inserted between layers 322 and 324.

While the present invention has been described with reference to a preferred embodiment thereof, those skilled in the art will know various changes in form that may be made without departing from the spirit and scope of the claimed invention as defined in the appended claims.

We claim:

1. A method in a data processing system having a communications stack with a plurality of layers for sending data to a remote computer and a message transfer system having a single entrypoint for transferring the data between the layers, comprising the computer-implemented steps of:

sending the data that is destined for the remote computer to the communications stack;

transferring the data between the layers using the single entrypoint of the message transfer system after the data is sent to the communications stack; and sending the data to the remote computer after transferring the data between the layers, wherein the data processing system comprises a plurality of computers, a first of the computers being connected to multiple computers of the plurality of computers via a network, wherein the first computer contains a first layer of the communications stack and the multiple computers contain remaining layers of the communications stack, and wherein the step of transferring the data between the layers includes transferring the data between the first layer on the first computer and at least one of the remaining layers on the multiple computers.

2. The method of claim 1, further including a step of inserting a debug layer into the communications stack.

3. The method of claim 2 wherein the debug layer receives the data via the message transfer system.

4. The method of claim 1, further including a step of starting the communications stack by a comstack manager before sending the data.

5. The method of claim 1 wherein the single entrypoint is a software construct that combines both data and behavior.

6. A method in a data processing system for configuring communications stacks having a plurality of layers used to send data, wherein the data processing system comprises a plurality of computers, a first of the computers being connected via a network to a second of the computers, the communications stacks managed by a comstack manager, comprising the steps of:

receiving first data into the comstack manager indicating the layers of a first communications stack having a first number of layers, wherein one of the layers indicated by the first data is located on the first computer and another of the layers indicated by the first data is located on the second computer;

starting the first communications stack with the layers indicated by the first data including the one layer located on the first computer and the another layer located on the second computer; and transferring the first data between the layers of the first communications stack after the first communications stack has been started.

7. The method of claim 6, further comprising the steps of:

receiving second data into the comstack manager indicating addition of an additional layer to the first communications stack; and adding the additional layer to the first communications stack.

8. The method of claim 6, further comprising the steps of:

receiving second data into the comstack manager indicating removal of a layer of the first communications stack; and removing the layer from the first communications stack in response thereto.

9. A method in a data processing system for configuring communications stacks having at least one layer for sending data to a remote computer, the communications stacks managed by a comstack manager, comprising the computer-implemented steps of:

starting a first communications stack by the comstack manager, the first communications stack having a first number of layers;

starting a second communications stack by the comstack manager, the second communications stack having a second number of layers different from the first number of layers of the first communications stack; and concurrently managing operations of the first communications stack and the second communications stack using the comstack manager.

\* \* \* \* \*